United States Patent
Wadekar et al.

(10) Patent No.: US 9,567,511 B2
(45) Date of Patent: Feb. 14, 2017

(54) CROSSLINKING RESIN FOR SAND CONSOLIDATION OPERATIONS

(71) Applicant: Halliburton Energy Services, Inc., Houston, TX (US)

(72) Inventors: Sushant Dattaram Wadekar, Mundhwa (IN); Snehalata Sachin Agashe, Pune (IN); Ranjeet Gangadhar Kshirsagar, Latur (IN)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 14/771,415

(22) PCT Filed: Nov. 19, 2014

(86) PCT No.: PCT/US2014/066302
§ 371 (c)(1),
(2) Date: Aug. 28, 2015

(87) PCT Pub. No.: WO2016/080974
PCT Pub. Date: May 26, 2016

(65) Prior Publication Data
US 2016/0362599 A1    Dec. 15, 2016

(51) Int. Cl.
*C09K 8/56* (2006.01)
*C08G 59/32* (2006.01)
(Continued)

(52) U.S. Cl.
CPC ............... *C09K 8/565* (2013.01); *C08G 59/32* (2013.01); *C08G 59/50* (2013.01); *C09K 8/56* (2013.01);
(Continued)

(58) Field of Classification Search
CPC ............. C09K 8/56; C09K 8/565; C09K 8/57; C09K 8/5751; C09K 8/5756; C08G 59/32; C08G 59/50; E21B 21/003; E21B 33/13; E21B 33/138
See application file for complete search history.

(56) References Cited

U.S. PATENT DOCUMENTS 3,316,966 A    5/1967  Dear
3,483,146 A   12/1969  Janssen et al.
(Continued)

FOREIGN PATENT DOCUMENTS

EP     0326177 A2    8/1989
WO  2014120486 A1    8/2014

OTHER PUBLICATIONS

International Search Report and Written Opinion for PCT/US2014/066302 dated Aug. 4, 2015.
(Continued)

*Primary Examiner* — Zakiya W Bates
*Assistant Examiner* — Crystal J Miller
(74) *Attorney, Agent, or Firm* — McDermott Will & Emery LLP; Craig Roddy

(57) ABSTRACT

Methods including introducing a treatment fluid comprising a solvent-base fluid and a consolidation composition into a wellbore in a subterranean formation, the consolidation comprising, a crosslinking diverting agent, a hardening agent, and a multi-functional epoxy resin, the multi-functional epoxy resin comprising at least three epoxy groups; coating a face of the subterranean formation with the consolidation composition; and at least partially curing the consolidation composition in the wellbore, to reduce production of unconsolidated particulates from the subterranean formation into the wellbore.

20 Claims, 1 Drawing Sheet

(51) Int. Cl.
*E21B 33/13* (2006.01)
*C09K 8/565* (2006.01)
*C09K 8/575* (2006.01)
*C08G 59/50* (2006.01)
*E21B 33/138* (2006.01)
*E21B 21/00* (2006.01)

(52) U.S. Cl.
CPC ........... *C09K 8/5751* (2013.01); *C09K 8/5756* (2013.01); *E21B 21/003* (2013.01); *E21B 33/138* (2013.01)

(56) References Cited

U.S. PATENT DOCUMENTS

| | | | |
|---|---|---|---|
| 4,049,510 A | 9/1977 | Rosenberg | |
| 4,521,564 A | 6/1985 | Solomon et al. | |
| 4,954,603 A | 9/1990 | Takata et al. | |
| 5,317,068 A | 5/1994 | Watanabe et al. | |
| 5,363,916 A | 11/1994 | Himes et al. | |
| 5,423,381 A | 6/1995 | Surles et al. | |
| 5,807,910 A | 9/1998 | Tseng et al. | |
| 6,016,870 A * | 1/2000 | Dewprashad | C09K 8/5756 166/276 |
| 7,036,589 B2 * | 5/2006 | Nguyen | C09K 8/512 166/280.1 |
| 7,500,521 B2 | 3/2009 | Nguyen et al. | |
| 8,017,561 B2 | 9/2011 | Nguyen | |
| 8,686,069 B2 | 4/2014 | Wang | |
| 2003/0069356 A1 | 4/2003 | Yasuda et al. | |
| 2007/0287767 A1 | 12/2007 | Ballard | |
| 2010/0326660 A1 | 12/2010 | Ballard et al. | |

OTHER PUBLICATIONS

Cheng et al., Curing behavior and thermal properties of trifunctional epoxy resin cured by 4,4'-diaminodiphenyl sulfone, Express Polymer Letters, vol. 3, No. 8 (2009) 501-509.

* cited by examiner

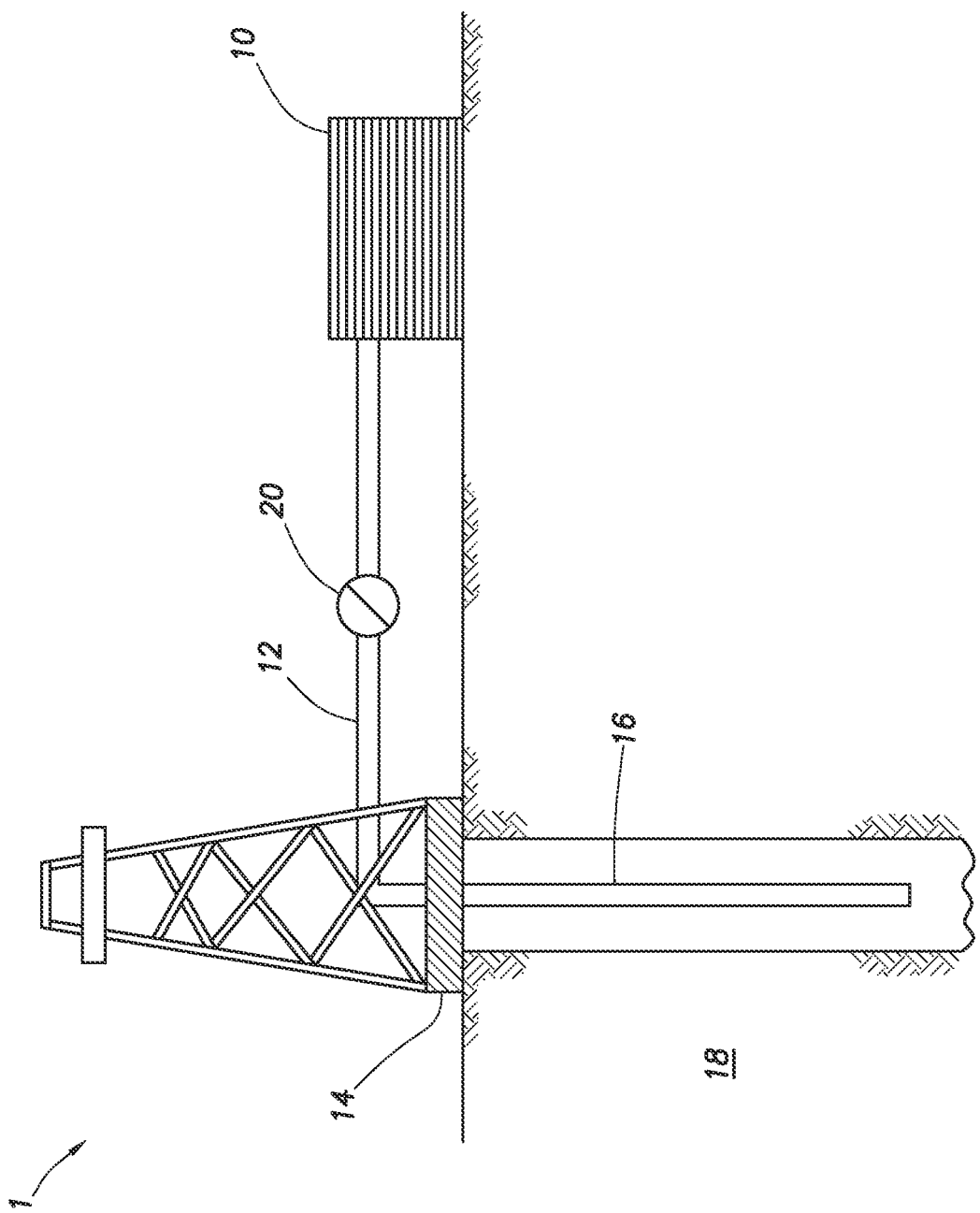

CROSSLINKING RESIN FOR SAND CONSOLIDATION OPERATIONS

BACKGROUND

The present disclosure is related to subterranean formation operations and, more particularly, to subterranean formation operations including a multi-functional epoxy resin.

Hydrocarbon-producing wells (e.g., vertical, deviated, and horizontal wells in a subterranean formation) are generally drilled using a drilling fluid pumped down a drill string and through a drill bit attached to the end of the drill string. The drilling fluid serves, among other things, to lubricate and cool the cutting surfaces of the drill bit, transport drill cuttings to the surface, control formation pressure, and maintain well stability. After drilling is complete, a casing string may be placed in the wellbore through which hydrocarbons will eventually flow. An annulus is formed between the casing string and the face of the wellbore, which may be partially or fully filled with cement in order to hold the casing string in place. In some applications, cementing of the annulus is not necessary and the casing string may be entirely uncemented, if included at all.

The process of drilling and/or stimulating a subterranean formation often creates unconsolidated particulates, such as from the natural abrasion of the formation itself and from any proppant not confined to a fracture (i.e., naturally occurring, placed during an operation, or created during an operation). These unconsolidated particulates may undesirably migrate within the formation. As used herein, the term "unconsolidated particulates" refers to any loose or loosely bonded particulates that may move through the formation with wellbore fluids (e.g., production fluids). Unconsolidated particulates may include, for example, sand, gravel, other particulates (e.g., proppant particulates), and/or formation fines.

The unconsolidated particulates may migrate out of the subterranean formation and be produced with production fluids. The presence of unconsolidated particulates in a formation during production is undesirable at least because they may damage or abrade producing equipment or reduce well production. For example, unconsolidated particulates may migrate into wellbore casings, perforations, or the interstitial spaces between packed proppants within a fracture and clog or hinder well production.

One method of controlling unconsolidated particulates is to treat the wellbore with a consolidating agent. In such treatments, a consolidating agent is placed into the wellbore in order to stabilize unconsolidated particulates, such as by contacting unconsolidated particulates and curing into a hardened mass. Typically, the consolidating agent may be used to lock unconsolidated particulates in place and form at least a partially immobilized substance, which may be accomplished by enhancing grain-to-grain or grain-to-formation contact of the unconsolidated particulates.

Long wellbores, including long deviated (e.g., horizontal or otherwise angled from vertical) are increasingly used to facilitate recovery of oil from very large reservoirs using only a single wellbore. Such long wellbores are often variable in multiple properties including, permeability, mineralogy, and the like. Due to such variability, consolidation of long wellbores may be difficult. For example, long interval wellbores having variable permeability may result in a treatment fluid including a consolidation agent to flow into regions of high permeability, leaving the low permeability regions untreated or unsatisfactorily treated. Mechanical isolation techniques may be employed to correct, at least partially, for the varying permeabilities. Such mechanical isolation techniques are often costly and time consuming.

BRIEF DESCRIPTION OF THE DRAWINGS

The following figure is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the consolidation compositions of the embodiments described herein to a downhole location.

DETAILED DESCRIPTION

The present disclosure is related to subterranean formation operations and, more particularly, to subterranean formation operations including a multi-functional epoxy resin. Specifically, treatment fluids comprise a consolidation composition including a multi-functional epoxy resin, a crosslinking diverting agent, and a hardening agent, which may act as an effective consolidating agent in downhole environments to mitigate the migration of unconsolidated particulates, as described above. As used herein, the terms "consolidation" and any grammatical variants thereof, may be used to refer to forming a substantially agglomerated material. As used herein, the term "substantially" means largely, but not necessarily wholly.

As described in detail below, the treatment fluids comprising the consolidation compositions described herein may be particularly effective at treating long wellbore intervals having variable permeability in a single step operation. That is, no mechanical isolation techniques are required and no additional pretreatment or post-treatment of the wellbore intervals is needed. As used herein, the term "long wellbore" or "long interval" and grammatically variants thereof (e.g., "long interval wellbore) refers to a wellbore having a length of at least about 30 meters ("m") (about 100 feet ("ft")), or in the range of a lower limit of about 30 m, 60 m, 90 m, 120 m, 150 m, 180 m, 210 m, 240 m, 270 m, 300 m, 330 m, 360 m, 390 m, 420 m, 450 m, and 480 m to an upper limit of about 920 m, 890 m, 860 m, 830 m, 800 m, 770 m, 740 m, 710 m, 680 m, 650 m, 620 m, 590 m, 560 m, 530 m, 500 m, 470 m, and 440 m, encompassing any value and subset therebetween. In some embodiments, the interval may be even longer, such as about 950 m, 980 m, 1010 m, 1040 m, 1070 m, 1100 m, 1130 m, 1160 m, 1190 m, 1220 m, or 1250 m, or even longer. The term "length" is not limited to any particular shape and encompasses any continuous treatment interval of a wellbore. As used herein, the term "variable permeability" and grammatical variants thereof (e.g., "varying permeability") refers to a formation having at least an area of low permeability and at least an area of high permeability. Any permeability regions therebetween may also exist within a variable permeability formation, without departing from the scope of the present disclosure. As used herein, the term "low permeability" refers to a formation that has a matrix permeability of less than 1,000 microDarcy (equivalent to 1 milliDarcy); the term "high permeability" refers to a formation that has a matrix permeability of greater than about 10 milliDarcy.

The treatment fluids comprising consolidation compositions may also be effective at providing consolidation in subterranean formations having elevated temperatures, such as those in the range of a lower limit of about 20° C., 25° C., 30° C., 35° C., 40° C., 45° C., 50° C., 55° C., 60° C., 65° C., 70° C., 75° C., 80° C., 85° C., 90° C., and 95° C. to an upper limit of about 175° C., 170° C., 165° C., 160° C., 155° C., 150° C., 145° C., 140° C., 135° C., 130° C., 125° C., 120° C., 115° C., 110° C., 105° C., 100° C., and 95° C., encompassing any value and subset therebetween. The treatment fluids herein may be particularly more effective at higher temperatures for treating long intervals that often use foam diverter fluids that are not as effective at these high temperatures.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Conventional consolidation compositions are designed to treat wellbores having uniform permeability. However, wellbores, particularly long wellbores, in actuality have variable permeabilities, and sometimes quite drastic variable permeabilities. In such circumstances, the consolidation composition largely enters in the regions of high permeability due to less restriction to flow in these regions, leaving the regions of low permeability untreated or unsatisfactorily treated. Specifically, The flow of fluid through a porous medium is defined by Darcy's law:

$$Q = \frac{-kA}{\mu} \frac{(P_b - P_a)}{L},$$

where Q is the total discharge (unites of volume per time, e.g., cubic meters per second ("m³/s")), k is the intrinsic permeability of a medium (m²), A is the cross-sectional area to flow (units of area, e.g., m²), $P_a$ is the well head pressure, $P_{ba}$ is the reservoir pressure, ($P_b-P_a$) is the pressure drop (Pascals ("Pa")), μ is viscosity (e.g., kg/(m·s) or Pa·s), and L is the length the pressure drop is taking place over. According to Darcy's law, the total discharge (or flow rate, i.e., Q/A) of a fluid through such porous media is proportional to permeability of the media. Hence, a lower amount of fluid is flowed in regions of low permeability.

To treat a long wellbore having variable permeability uniformly, the total discharge or flow rate of the fluid through all portions of the wellbore (i.e., all permeabilities) should be substantially equal. To achieve this, permeability should be balanced against the other parameters in Darcy's law. Because well head pressure and reservoir pressure remain constant, the term "($P_b-P_a$)" is also constant. Accordingly, the only parameter than can be manipulated is viscosity, and, thus, the viscosity of a consolidation composition (and/or a treatment fluid comprising a consolidation composition) should be increased so as to balance the permeability so volumetric total discharge is substantially equal in all portions of the wellbore. As such, the viscosity of a consolidation composition (and/or a treatment fluid comprising a consolidation composition) should first divert to high permeability regions, then increase in viscosity such that further flow is restricted, thereby diverting to lower permeability regions.

In some embodiments described herein, a consolidation composition is provided comprising a multi-functional epoxy resin, a crosslinking diverting agent, and a hardening agent. As used herein, the term "multi-functional epoxy resin," refers to a chemical moiety having at least three reactive epoxy functional groups. The consolidation composition, in some embodiments, may be delivered to a downhole location by including the consolidation composition into a treatment fluid comprising a solvent-base fluid and introducing the treatment fluid into a wellbore in a subterranean formation. The consolidation composition may be coated onto a face of the subterranean formation and, thereafter, at least partially cure in the wellbore to reduce the production of unconsolidated particulates from the subterranean formation into the wellbore.

As used herein, the term "formation face," and grammatical variants thereof (e.g., "face of a formation," "face of a subterranean formation," and the like) refers to any portion of the formation that is exposed to a material introduced into the formation (e.g., a fluid, a particulate, and the like). A formation face may also include a fracture face. As used herein, the term "coat" refers to the ability of the consolidation composition to permeate (i.e., spread) around, into, or onto a surface and concentrate thereby, thereon, or therein; the term does not imply any particular degree of coverage. The term "cure" and grammatical variants thereof (e.g., "curing," "cured," and the like) refers to the end result of a composition becoming a hard, solid mass, such that the composition, without additional additives, can no longer increase in hardness. As used herein, the term "partially cure" and grammatical variants thereof refers to a composition that has cured by at least about 20%.

Without being limited by theory, it is believed that the multi-functional epoxy resin, the crosslinking diverting agent, and the hardening agent synergistically work together to provide the viscosity enhancements alone and/or in a treatment fluid comprising a solvent-base fluid needed to treat varying permeability wellbores, for example, including long wellbores having varying permeabilities. The multi-functional epoxy resin may first quickly react with the crosslinking diverting agent to develop an increased viscosity over a short period of time. The reaction may be such that the molecular weight of the multi-functional resin increases to facilitate viscosification, without completely curing and blocking the formation. That is, the multi-functional epoxy resin and the crosslinking diverting agent react almost instantly (without initial interference from the hardening agent) so as to increase viscosity of the consolidation composition (and/or of the treatment fluid comprising the consolidation composition) without completely curing the multi-functional resin. After the treatment fluid comprising the consolidation composition is diverted to low permeability regions of the wellbore (from high permeability regions), the hardening agent may fully cure the multi-functional epoxy resin so as to prevent migration of unconsolidated particulates from the formation.

In some embodiments, the multi-functional epoxy resin has three epoxy groups. Without being limited by theory, it is believed that the initial increase in viscosification (without curing) is achieved by using the crosslinking diverting agent in molar proportion to the multi-functional epoxy resin. The crosslinking diverting agent may thus react with only one of the three epoxy groups on the multi-functional epoxy resin. Thereafter, the remaining two epoxy groups are reacted with the hardening agent in the consolidation composition to cure the multi-functional epoxy resin completely.

The at least partially cured consolidation compositions of the present disclosure also exhibit increased unconfined compressive strength ("UCS") as compared to traditional consolidating resins. Compressive strength is needed to effectively provide consolidation in a subterranean formation in order to prevent or reduce flowback of unconsolidated particulates into a wellbore from the formation or formation face. In some embodiments, the consolidation compositions of the present disclosure exhibit a compressive strength of greater than about 100 psi, or in some instances in the range of from about 100 psi, 200 psi, 300 psi, 400 psi, 500 psi, 600 psi, 700 psi, 800 psi, 900 psi, 1000 psi, 1100 psi, 1200 psi, 1300 psi, 1400 psi, and 1500 psi to an upper limit of about 3000 psi, 2900 psi, 2800 psi, 2700 psi, 2600 psi, 2500 psi, 2400 psi, 2300 psi, 2200 psi, 2100 psi, 2000 psi, 1900 psi, 1800 psi, 1700 psi, 1600 psi, and 1500 psi, or even higher, and encompassing any value and subset therebetween.

As previously discussed, the consolidation composition (which may be included in a treatment fluid comprising a solvent-base fluid) of the present disclosure may comprise a multi-functional epoxy resin, a crosslinking diverting agent, and a hardening agent.

The multi-functional epoxy resin may comprise at least three epoxy functional groups. The epoxy groups may be disposed symmetrically or asymmetrically in the multi-functional epoxy resin. In some embodiments, the epoxy groups forming part of the multi-functional epoxy resin may be one or more glycidyl groups. Suitable glycidyl groups may have the following general Formula I:

Formula I

Suitable glycidyl groups may include, but are not limited to, an aliphatic glycidyl ether, a cycloaliphatic glycidyl ether, an aromatic glycidyl ether, a polyglycidyl ether, and any combination thereof. Accordingly, the multi-functional epoxy resin of the present disclosure may have one or more, or all of the same glycidyl groups or one or more, or all different glycidyl groups, without departing from the scope of the present disclosure. Specific examples of suitable glycidyl groups may include bisphenol epoxy adducts.

Suitable aliphatic glycidyl ethers may include, but are not limited to, allyl glycidyl ether, n-butyl glycidyl ether, t-butyl glycidyl ether, 2-ethyl hexyl glycidyl ether, a glycidyl ether of an aliphatic alcohol, a glycidyl ether of polypropyleneglycol, and any combination thereof. Suitable cycloaliphatic glycidyl ethers for use in the present disclosure may include, but are not limited to, cyclohexanedimethanol diglycidyl ether. Suitable aromatic glycidyl ethers may include, but are not limited to, tert-butylphenyl glycidyl ether, cresyl glycidyl ether, p-fluorophenyl glycidyl ether, alpha-naphthyl glycidyl ether, phenyl glycidyl ether, and any combination thereof. Suitable polyglycidyl ethers for use as epoxy groups in the multi-functional epoxy resin may include, but are not limited to, 1,6-hexanediol diglycidyl ether, 1,4-butanediol diglycidyl ether, cyclohexanedimethanol diglycidyl ether, 1,1,1-trimethylolpropane polyglycidyl ether, diethyleneglycol diglycidyl ether, a diglycidyl ether of pentaerythritol, neopentyl glycol diglycidyl ether, cyclohexanedimethanol diglycidyl ether, trimethylolethane triglycidyl ether, ethylene glycol diglycidyl ether, dibromo neopentyl glycol diglycidyl ether, propoxylated glycerin triglycidyl ether, polyglycerol-3-polyglycidyl ether, sorbitol polyglycidyl ether, and any combination thereof.

Specific examples of multi-functional epoxy resins that may be used in the embodiments of the present disclosure may include, but are not limited to, glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N',N'-tetraglycidyl-m-xylenediamine; tetraglycidylmethylenedianiline; and any combination thereof.

As a non-limiting example of a multi-functional epoxy resin having three epoxy groups, trimethylolpropane triglycidyl ether may be used in the consolidation compositions of the present disclosure, having the following Formula II:

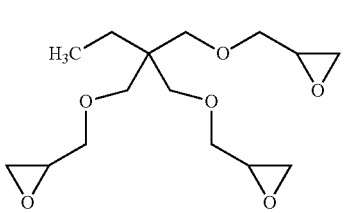

Formula II

In some embodiments, without being bound by theory, the crosslinking diverting agent of the consolidation composition may react with the top right glycidyl group of Formula II, causing the consolidation composition to viscosify (and/or the treatment fluid comprising the consolidation composition to viscosity) into which in is included (e.g., increase in molecular weight). The increased viscosity allows the consolidation composition (and/or the treatment fluid comprising the consolidation composition) to divert from high permeability regions to low permeability regions in order to at least contact the majority of the entire length of the wellbore with the consolidation composition. The hardening agent may react with the bottom two epoxy groups and at least partially cure the multi-functional epoxy resin such that it is effective as a consolidating agent, as described above.

Another non-limiting example of a multi-functional epoxy resin having three epoxy groups is glycerol triglycidyl ether, having the following Formula III:

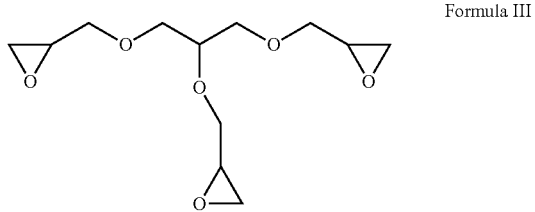 [SMILES: C(OCC1CO1)C(COCC1CO1)OCC1CO1]

Formula III

Yet another non-limiting example of a multi-functional epoxy resin suitable for use in the consolidation compositions of the present disclosure may be pentaerythritol tetraglycidyl ether, having four epoxy groups and the following Formula IV:

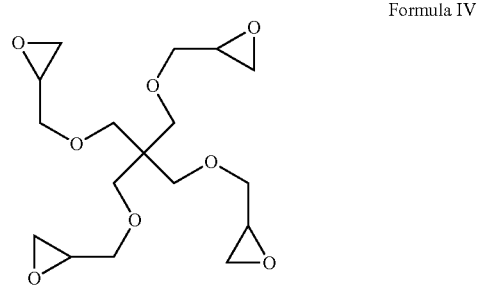 [SMILES: C(OCC(COCC1CO1)(COCC1CO1)COCC1CO1)C1CO1]

Formula IV

Some of the multi-functional epoxy resin compositions suitable for use in the present disclosure, are advantageously derived from natural raw materials that are relatively inexpensive and readily available, thereby making them cost effective resins compared to those traditionally used in consolidation operations. Moreover, derivation from natural raw materials may ensure that the multi-functional epoxy resins described herein are from a renewable resource. Specifically, for example, pentaerythritol tetraglycidyl ether (Formula IV) is derived from the raw material glycerol, which itself may be obtained from vegetable oils using inexpensive processing (e.g., fat splitting, biodiesel production, and the like).

In some embodiments, the multi-functional epoxy resin may be present in an amount in the range of a lower limit of about 0.5%, 1%, 2%, 3%, 4%, 5%, 6%, 7%, 8%, 9%, 10%, 11%, 12%, 13%, 14%, 15%, 16%, 17%, 18%, 19%, and 20% to an upper limit of about 40%, 39%, 38%, 37%, 36%, 35%, 34%, 33%, 32%, 31%, 30%, 29%, 28%, 27%, 26%, 25%, 24%, 23%, 22%, 21%, and 20% by volume of the consolidation composition, encompassing any value and subset therebetween.

The crosslinking diverting agent of the present disclosure may be a long-chain amine having at least one primary amine group. The long-chain amine may have a carbon chain in the range of from a lower limit of about 8, 10, 12, 14, 16, 18, 20, 22, 24, 26, 28, 30, 32, 34, 36, 38, 40, 42, 44, 46, 48, and 50 carbon atoms to an upper limit of about 90, 88, 86, 84, 82, 80, 78, 76, 74, 72, 70, 68, 66, 64, 62, 60, 58, 56, 54, 52, and 50 carbon atoms, encompassing any value and subset therebetween. In some embodiments, the long-chain amine may have a molecular mass range in the range of a lower limit of about 125 grams/mole ("g/mol"), 175 g/mol, 225 g/mol, 275 g/mol, 325 g/mol, 375 g/mol, 425 g/mol, 475 g/mol, 525 g/mol, 575 g/mol, 625 g/mol, 675 g/mol, 725 g/mol, and 775 g/mol to an upper limit of about 1500 g/mol, 1450 g/mol, 1400 g/mol, 1350 g/mol, 1300 g/mol, 1250 g/mol, 1200 g/mol, 1150 g/mol, 1100 g/mol, 1050 g/mol, 1000 g/mol, 950 g/mol, 900 g/mol, 850 g/mol, 800 g/mol, and 750 g/mol, encompassing any value and subset therebetween. The crosslinking diverting agent may be capable of increasing the initial crosslinking of the multi-functional epoxy resin in the consolidation composition to increase viscosity, for example.

Examples of suitable crosslinking diverting agents for use in the embodiments described herein may include, but are not limited to, a cocoamine, a cocodiamine, phenalkamine, a dimer amine, a dimer diamine, a polymeric amine (e.g., polyvinyl amine, polyalkylimine, polyalkylenimine, a linear aliphatic amine polymer, an aminated polyepichlorohydrin, and the like), and any combination thereof. In some embodiments, the crosslinking diverting agent may be present in an amount in the range of a lower limit of about 0.1%, 0.25%, 0.5%, 0.75%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, and 11.5% to an upper limit of about 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, 15%, 14.5%, 14%, 13.5%, 13%, 12.5%, 12%, and 11.5% by volume of the consolidation composition, encompassing any value and subset therebetween.

Any material capable of curing the multi-functional epoxy resins described in the embodiments of the present disclosure may be used as the hardening agent of the consolidation compositions herein. Examples of suitable hardening agents may include, but are not limited to, a cyclo-aliphatic amine (e.g., piperazine, derivatives of piperazine (e.g., aminoethylpiperazine), modified piperazines, hydrogenated methylene dianiline, an imidazolidine, an imidazoline and the like), an aromatic amine (e.g., methylene dianiline, derivatives of methylene dianiline, 4,4'-diaminodiphenyl sulfone, and the like), an aliphatic amine (e.g., ethylene diamine, diethylene triamine, triethylene tetraamine, tetraethylene pentaamine, and the like), an imidazole, a pyrazole, a 1H-indazole, a purine, an indazole, an amine, a polyamine, a polyimine, an amide, a polyamide, a 2-ethyl-4-methyl imidazole, and any combination thereof.

In some embodiments, the hardening agent may be present in an amount in the range of from a lower limit of about 1%, 2.5%, 5%, 7.5%, 10%, 12.5%, 15%, 17.5%, 20%, 22.5%, 25.5%, 25%, 27.5%, 30%, 32.5%, 35%, and 37.5% to an upper limit of about 75%, 72.5%, 70%, 67.5%, 65%, 62.5%, 60%, 57.5%, 55%, 52.5%, 50%, 47.5%, 45%, 42.5%, 40%, and 37.5% by volume of the consolidation composition, encompassing any value and subset therebetween.

In some embodiments, the hardening agent may be encapsulated in an encapsulating material, such as to delay curing of the multi-functional epoxy resin, such as to ensure that the consolidation composition is dispersed satisfactorily throughout a wellbore interval. In some embodiments, the hardening agent may be encapsulated, for example, with a porous encapsulating material through which the hardening agent may diffuse slowly, or a degradable encapsulating material that degrades downhole due to exposure to conditions in the wellbore (e.g., temperature, pH, produced fluids, and the like). Suitable encapsulating materials may include, but are not limited to, polyvinyl alcohol, polylactic acid, ethylene propylene diene monomer rubber, polyvinylidene chloride, polyacrylamide, nylon, waxes, polyurethanes, cross-linked partially hydrolyzed acrylics, and any combination thereof.

In some embodiments, the consolidation composition of the present disclosure may be included in a treatment fluid. The treatment fluid may, for example, solubilize the consolidation composition or simply aid in pumping the consolidation composition to a downhole location. The treatment fluids comprising the consolidation composition include a solvent-base fluid. Suitable solvent-base fluids may include, but are not limited to an alcohol, a glycerin, a glycol, a polyglycol, a glycol ether, a polyglycol amine, a polyol, and any combination thereof.

Other specific examples of suitable solvent-base fluids for use in forming the treatment fluids described herein may include, but are not limited to, mineral oils, paraffinic solvents (e.g., naphtha), methanol, isopropanol, ethanol, n-propanol, n-butanol, sec-butanol, isobutanol, t-butanol, propylene glycol, ethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, butylglycidyl ether, diethylene glycol methyl ether, 2-butoxy ethanol, ethers of a C2 to C6 dihydric alkanol containing at least one C1 to C6 alkyl group, mono ethers of dihydric alkanol, mono ethers of methoxypropanol, monoethers of methoxypropanol, and any combination thereof. Isomers and derivatives of the foregoing may also be suitable. Selection of an appropriate solvent-base fluid is dependent upon a number of factors such as, for example, the type of multi-functional epoxy resin selected, the type of crosslinking diverting agent selected, the conditions of the wellbore/formation, and the like.

When the consolidation composition is included in a treatment fluid comprising a solvent-base fluid, the consolidation composition may be present in an amount in the range of from a lower limit of about 1%, 2%, 5%, 10%, 15%, 20%, 25%, 30%, 35%, 40%, 45%, and 50% to an upper limit of about 99.9%, 95%, 90%, 85%, 80%, 75%, 70%, 65%, 60%, 55%, and 50% by volume of the treatment fluid, encompassing any value and subset therebetween. In some embodiments, the consolidation composition is included in a treatment fluid comprising a solvent-base fluid in an amount in the range of between about 2% and about 40%, or about 5% to about 20%, encompassing any value and subset therebetween. Accordingly, as mentioned previously, the consolidation composition may be used alone or diluted into a solvent-base fluid in a treatment fluids.

In some embodiments, the treatment fluids described herein may further comprise an additive for use in performing a particular subterranean formation operation. Suitable additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the consolidation compositions (used herein to include the consolidation composition alone or included in a treatment fluid) described herein to a downhole location are described. In various embodiments, the systems can comprise a pump fluidly coupled to a tubular, the tubular containing the consolidation compositions described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the consolidation composition to a subterranean formation at or above a fracture gradient of the subterranean formation, but it may also be used in cases where fracturing is not desired. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the consolidation composition to the high pressure pump. In such embodiments, the low pressure pump may "step up" the pressure of the consolidation composition before it reaches the high pressure pump.

In some embodiments, the systems described herein can further comprise a mixing tank that is upstream of the pump and in which the consolidation composition is formulated. In various embodiments, the pump (e.g., a low pressure pump, a high pressure pump, or a combination thereof) may convey the consolidation composition from the mixing tank or other source of the consolidation composition to the tubular. In other embodiments, however, the consolidation composition can be formulated offsite and transported to a worksite, in which case the consolidation composition may be introduced to the tubular via the pump directly from its shipping container (e.g., a truck, a railcar, a barge, or the like) or from a transport pipeline. In either case, the consolidation composition may be drawn into the pump, elevated to an appropriate pressure, and then introduced into the tubular for delivery downhole.

FIG. 1 shows an illustrative schematic of a system that can deliver consolidation compositions of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a consolidation composition of the present invention may be formulated. The consolidation composition may be conveyed via line 12 to wellhead 14, where the consolidation composition enters tubular 16, tubular 16 extending from wellhead 14 into subterranean formation 18. Upon being ejected from tubular 16, the consolidation composition may subsequently penetrate into subterranean formation 18. In some instances, tubular 16 may have a plurality of orifices (not shown) through which the consolidation composition of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the consolidation composition to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the consolidation composition may, in some embodiments, flow back to wellhead 14 and exit subterranean formation 18. In some embodiments, the consolidation composition that has flowed back to wellhead 14 may subsequently be recovered and recirculated to subterranean formation 18.

It is also to be recognized that the disclosed consolidation compositions may also directly or indirectly affect the various downhole equipment and tools that may come into contact with the consolidation compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: introducing a treatment fluid comprising a solvent-base fluid and a consolidation composition into a wellbore in a subterranean formation, the consolidation comprising a multi-functional epoxy resin, a crosslinking diverting agent, and a hardening agent, the multi-functional epoxy resin comprising at least three epoxy groups; coating a face of the subterranean formation with the consolidation composition; and at least partially curing the consolidation composition in the wellbore, to reduce production of unconsolidated particulates from the subterranean formation into the wellbore.

Embodiment A may have one or more of the following additional elements in any combination:

Element A1: Wherein the multi-functional epoxy resin is present in an amount in the range of about 0.5% to about 40% by volume of the consolidation composition.

Element A2: Wherein the at least three epoxy groups are glycidyl ether groups selected from the group consisting of an aliphatic glycidyl ether, a cycloaliphatic glycidyl ether, an aromatic glycidyl ether, a polyglycidyl ether, and any combination thereof.

Element A3: Wherein the multi-functional epoxy resin is selected from the group consisting of glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N,N'-tetraglycidyl-m-xylenediamine; tetraglycidylmethylenedianiline; and any combination thereof.

Element A4: Wherein the at least three epoxy groups are disposed symmetrically or asymmetrically in the multi-functional epoxy resin.

Element A5: Wherein the crosslinking diverting agent is present in an amount in the range of about 0.1% to about 25% by volume of the consolidation composition.

Element A6: Wherein the crosslinking diverting agent is a long-chain amine having a chain length in the range of about 8 to about 90 carbon atoms and having at least one primary amine group.

Element A7: Wherein the crosslinking diverting agent is selected from the group consisting of a cocoamine, a cocodiamine, phenalkamine, a dimer amine, a dimer diamine, and any combination thereof.

Element A8: Wherein the crosslinking diverting agent is a polymeric amine.

Element A9: Wherein the hardening agent is present in an amount in the range of about 1% to about 75% by volume of the consolidation composition.

Element A10: Wherein the hardening agent is selected from the group consisting of a cyclo-aliphatic amine, an aromatic amine, an aliphatic amine, an imidazole, a pyrazole, a 1H-indazole, a purine, an indazole, an amine, a polyamine, a polyimine, an amide, a polyamide, a 2-ethyl-4-methyl imidazole, and any combination thereof.

Element A11: Wherein the consolidation composition is present in the treatment fluid in an amount in the range of about 5% to about 99.9% by volume of the treatment fluid.

Element A12: Wherein the subterranean formation has a temperature of in the range of about 20° C. to about 175° C.

Element A13: Further comprising a tubular extending into the wellbore and a pump fluidly coupled to the tubular, wherein the treatment fluid is introduced into the wellbore through the tubular.

By way of non-limiting example, exemplary combinations applicable to A include: A with A1 and A2; A with A3, A5, and A13; A with A4 and A11; A with A6, a7, and A10;

A with A9, A10, A11, A12, and A13; A with a1 and A8; A with A4, A7, and A13; A with A4 and A5; A with A11 and A13; A with A1 and A12.

Embodiment B: A method comprising: introducing a treatment fluid comprising a solvent-base fluid and a consolidation composition into a wellbore in a subterranean formation, the wellbore having a length of greater than about 30 meters and exhibiting variable permeability, the consolidation comprising a multi-functional epoxy resin, a crosslinking diverting agent, and a hardening agent, and the multi-functional epoxy resin comprising at least three epoxy groups; coating a face of the subterranean formation with the consolidation composition; and at least partially curing the consolidation composition in the wellbore, thereby reducing production of unconsolidated particulates from the subterranean formation into the wellbore.

Embodiment B may have one or more of the following additional elements in any combination:

Element B1: Wherein the multi-functional epoxy resin is present in an amount in the range of about 0.5% to about 40% by volume of the consolidation composition.

Element B2: Wherein the at least three epoxy groups are glycidyl ether groups selected from the group consisting of an aliphatic glycidyl ether, a cycloaliphatic glycidyl ether, an aromatic glycidyl ether, a polyglycidyl ether, and any combination thereof.

Element B3: Wherein the multi-functional epoxy resin is selected from the group consisting of glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N,N'-tetraglycidyl-m-xylenediamine; tetraglycidylmethylenedianiline; and any combination thereof.

Element B4: Wherein the at least three epoxy groups are disposed symmetrically or asymmetrically in the multi-functional epoxy resin.

Element B5: Wherein the crosslinking diverting agent is present in an amount in the range of about 0.1% to about 25% by volume of the consolidation composition.

Element B6: Wherein the crosslinking diverting agent is selected from the group consisting of a long-chain amine having a chain length in the range of about 8 to about 90 carbon atoms and having at least one primary amine group, a polymeric amine, and any combination thereof.

Element B7: Wherein the crosslinking diverting agent is selected from the group consisting of a cocoamine, a cocodiamine, phenalkamine, a dimer amine, a dimer diamine, and any combination thereof.

Element B8: Wherein the hardening agent is present in an amount in the range of about 1% to about 75% by volume of the consolidation composition.

Element B9: Wherein the hardening agent is selected from the group consisting of a cyclo-aliphatic amine, an aromatic amine, an aliphatic amine, an imidazole, a pyrazole, a 1H-indazole, a purine, an indazole, an amine, a polyamine, a polyimine, an amide, a polyamide, a 2-ethyl-4-methyl imidazole, and any combination thereof.

Element B10: Wherein the consolidation composition is present in the treatment fluid in an amount in the range of about 5% to about 99.9% by volume of the treatment fluid.

Element B11: Wherein the subterranean formation has a temperature of in the range of about 20° C. to about 175° C.

Element B12: Further comprising a tubular extending into the wellbore and a pump fluidly coupled to the tubular, wherein the treatment fluid is introduced into the wellbore through the tubular.

By way of non-limiting example, exemplary combinations applicable to B include: B with B2, B5, and B12; B with B6 and B8; B with B1, B3, B10, and B11; B with B4, B5, and B7; B with B9 and B12; B with B8 and B10; B with B1, B5, and B12; B with B4 and B6.

Embodiment C: A consolidation composition comprising: a multi-functional epoxy resin comprising at least three epoxy groups, the multi-functional epoxy resin being present in an amount in the range of about 0.5% to about 40% by volume of the consolidation composition; a crosslinking diverting agent selected from the group consisting of a long-chain amine having in the range of about 8 to about 90 carbon atoms and having at least one primary amine group, a polymeric amine, and any combination thereof, the crosslinking diverting agent being present in an amount in the range of about 0.1% to about 25% by volume of the consolidation composition; and a hardening agent selected from the group consisting of a cyclo-aliphatic amine, an aromatic amine, an aliphatic amine, an imidazole, a pyrazole, a 1H-indazole, a purine, an indazole, an amine, a polyamine, a polyimine, an amide, a polyamide, a 2-ethyl-4-methyl imidazole, and any combination thereof, wherein the hardening agent is present in an amount in the range of about 1% to about 75% by volume of the consolidation composition.

Embodiments C may have one or more of the following additional elements in any combination:

Element C1: Wherein the at least three epoxy groups are glycidyl ether groups selected from the group consisting of an aliphatic glycidyl ether, a cycloaliphatic glycidyl ether, an aromatic glycidyl ether, a polyglycidyl ether, and any combination thereof.

Element C2: Wherein the multi-functional epoxy resin is selected from the group consisting of glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N,N'-tetraglycidyl-m-xylenediamine; tetraglycidylmethylenedianiline; and any combination thereof.

Element C3: Wherein the at least three epoxy groups are disposed symmetrically or asymmetrically in the multi-functional epoxy resin.

Element C4: Wherein the crosslinking diverting agent is selected from the group consisting of a cocoamine, a cocodiamine, phenalkamine, a dimer amine, a dimer diamine, and any combination thereof.

By way of non-limiting example, exemplary combinations applicable to C include: C with C1 and C2; C with C1 and C3; C with C1 and C4; C with C2 and C3; C with C2 and C4; C with C3 and C4; C with C1, C2 and C3; C with C2, C3, and C4; C with C1, C3, and C4; C with C1, C2, and C4; C with C1, C2, C3, and C4.

"Exemplary" is used exclusively herein to mean "serving as an example, instance, or illustration." Any embodiment described herein as exemplary is not to be construed as preferred or advantageous over other embodiments.

To facilitate a better understanding of the embodiments of the present disclosure, the following example of representative embodiments are given. In no way should the following example be read to limit, or to define, the scope of the disclosure.

EXAMPLE

In this example, a traditional epoxy resin composition was compared to various compositions comprising components of the consolidation compositions described herein or complete consolidation compositions. The various compositions ("Comp #") were prepared according to Table 1. The use of "–" in Table 1 indicates that the component was not included in the particular composition. Where included, the "%" based on volume per volume molar proportions for each component is provided, and the remaining volume balanced using a methanol solvent-base fluid. The "%" of crosslinking diverting agent, where included, was calculated based on molar proportions of the multi-functional epoxy resin, which is believed to encourage the crosslinking diverting agent to react only one of the epoxy groups, as described above with reference to Formula II.

TABLE 1

| Comp # | Resin Type (% vol/vol) | Crosslinking Diverting Agent (% vol/vol) | Hardening Agent (% vol/vol) |
|---|---|---|---|
| 1 | Monofunctional epoxy resin (25%) | — | Polyamine (25%) |
| 2 | Trimethylolpropane triglycidyl ether (4.5%) | — | Polyamine (12.5%) |
| 3 | Trimethylolpropane triglycidyl ether (9%) | — | Polyamine (25%) |
| 4 | Trimethylolpropane triglycidyl ether (9%) | Cocoamine (4.5%) | Polyamine (25%) |
| 5 | Trimethylolpropane triglycidyl ether (9%) | Cocodiamine (3.6%) | Polyamine (25%) |
| 6 | Trimethylolpropane triglycidyl ether (9%) | Dimer amine (6.5%) | Polyamine (25%) |
| 7 | Trimethylolpropane triglycidyl ether (9%) | Polyalkylimine (2.1%) | Polyamine (25%) |

Each of Compositions 1-7 ("C1-C7") was cured and their unconfined compressive strengths measured, as follows. Oklahoma Sand #1 was packed into 10 milliliter ("mL") syringes for each of C1-C7. Thereafter, each syringe was flushed in order with the following pore volumes ("PV") of fluids: (1) 3PV of 3% potassium chloride brine, (2) 3PV of a paraffinic solvent, (3) 2PV of C1-C7, and (4) 3PV of a paraffinic solvent. The paraffinic solvent in step (2) (pre-flush) was used to clean the surface of the formation sand to make it accessible for adsorption of the resin in C1-C7; the paraffinic solvent in step (4) (post-flush) was used to push any remaining resin deeper into the formation so that it will not block the formation. All excess liquid was drained completely from the syringes and each was cured at 60° C. (140° F.) for 18 hours. Thereafter, the cured resin compositions were tested in terms of unconfined compressive strength. The results are shown in Table 2. Tests were carried out by using a Hulong Transglobal fully automated compression testing equipment model ZZY-C. The UCS measurements were performed at atmospheric temperature.

TABLE 2

| | Comp # | | | | | | |
|---|---|---|---|---|---|---|---|
| | 1 | 2 | 3 | 4 | 5 | 6 | 7 |
| USC (psi) | 216 | 467 | 700 | 1599 | 1440 | 1428 | 1291 |

The results in Table 2 indicate that the multi-functional epoxy resins of the present disclosure in the presence of a hardening agent alone exhibit superior (greater than 100% fold, and even greater than 300%) compressive strength compared to traditional monofunctional epoxy resins, even at much reduced concentrations. Moreover, the compressive strength of the multi-functional epoxy resins was significantly enhanced (compare C3 to C4-C7) when a crosslinking diverting agent was included, thereby forming the consolidation compositions described herein. The compressive strength of C4-C7, as compared to C1, increased on average by 100% with the addition of the crosslinking diverting agent, as opposed to the multi-functional epoxy resin and hardening agent alone. The molar proportions of the various crosslinking diverting agents varied in their effect on the compressive strength of each consolidation composition only relatively minimally; however, direct comparison indicates that cocoamine, cocodiamine, and dimer amine crosslinking diverting agents are superior to polyalkylimine crosslinking diverting agents, and cocoamine crosslinking diverting agents are superior to each of the remaining in increasing compressive strength.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
introducing a treatment fluid comprising a solvent-base fluid and a consolidation composition into a wellbore in a subterranean formation, the consolidation comprising a multi-functional epoxy resin, a crosslinking diverting agent, and a hardening agent,
the multi-functional epoxy resin comprising at least three epoxy groups;
coating a face of the subterranean formation with the consolidation composition; and
at least partially curing the consolidation composition in the wellbore, to reduce production of unconsolidated particulates from the subterranean formation into the wellbore.

2. The method of claim 1, wherein the multi-functional epoxy resin is present in an amount in the range of about 0.5% to about 40% by volume of the consolidation composition.

3. The method of claim 1, wherein the at least three epoxy groups are glycidyl ether groups selected from the group consisting of an aliphatic glycidyl ether, a cycloaliphatic glycidyl ether, an aromatic glycidyl ether, a polyglycidyl ether, and any combination thereof.

4. The method of claim 1, wherein the multi-functional epoxy resin is selected from the group consisting of glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N,N'-tetraglycidyl-m-xylenediamine; tetraglycidylmethylenedianiline; and any combination thereof.

5. The method of claim 1, wherein the at least three epoxy groups are disposed symmetrically or asymmetrically in the multi-functional epoxy resin.

6. The method of claim 1, wherein the crosslinking diverting agent is present in an amount in the range of about 0.1% to about 25% by volume of the consolidation composition.

7. The method of claim 1, wherein the crosslinking diverting agent is a long-chain amine having a chain length in the range of about 8 to about 90 carbon atoms and having at least one primary amine group.

8. The method of claim 7, wherein the crosslinking diverting agent is selected from the group consisting of a cocoamine, a cocodiamine, phenalkamine, a dimer amine, a dimer diamine, and any combination thereof.

9. The method of claim 1, wherein the crosslinking diverting agent is a polymeric amine.

10. The method of claim 1, wherein the hardening agent is present in an amount in the range of about 1% to about 75% by volume of the consolidation composition.

11. The method of claim 1, wherein the hardening agent is selected from the group consisting of a cyclo-aliphatic amine, an aromatic amine, an aliphatic amine, an imidazole, a pyrazole, a 1H-indazole, a purine, an indazole, an amine, a polyamine, a polyimine, an amide, a polyamide, a 2-ethyl-4-methyl imidazole, and any combination thereof.

12. The method of claim 1, wherein the consolidation composition is present in the treatment fluid in an amount in the range of about 5% to about 99.9% by volume of the treatment fluid.

13. The method of claim 1, wherein the subterranean formation has a temperature of in the range of about 20° C. to about 175° C.

14. The method of claim 1, further comprising a tubular extending into the wellbore and a pump fluidly coupled to the tubular, wherein the treatment fluid is introduced into the wellbore through the tubular.

15. A method comprising:
introducing a treatment fluid comprising a solvent-base fluid and a consolidation composition into a wellbore in a subterranean formation,
the wellbore having a length of greater than about 30 meters and exhibiting variable permeability,
the consolidation comprising a multi-functional epoxy resin, a crosslinking diverting agent, and a hardening agent, and
the multi-functional epoxy resin comprising at least three epoxy groups;
coating a face of the subterranean formation with the consolidation composition; and
at least partially curing the consolidation composition in the wellbore, thereby reducing production of unconsolidated particulates from the subterranean formation into the wellbore.

16. The method of claim 15, wherein the at least three epoxy groups are glycidyl ether groups selected from the group consisting of an aliphatic glycidyl ether, a cycloaliphatic glycidyl ether, an aromatic glycidyl ether, a polyglycidyl ether, and any combination thereof.

17. The method of claim 15, wherein the multi-functional epoxy resin is selected from the group consisting of glycerol triglycidyl ether; triphenylolmethane triglycidyl ether; 1,1,1-tris(4-hydroxyphenyl)ethane triglycidyl ether; triglycidyl-p-aminophenol; trimethylolpropane triglycidyl ether; 1,3,5-triglycidyl-isocyanurate; (R,R,R)-triglycidyl isocyanurate; isocyanuric acid (S,S,S)-triglycidyl ester; glycerol propoxylate triglycidyl ether; N,N-diglycidyl-4-glycidyloxyaniline; 2,4,6-tris(oxiranylmethoxy)-1,3,5-triazine; triglycidyl-m-aminophenol; triglycidyl-4-amino-m-cresol; triglycidyl-5-amino-o-cresol; pentaerythritol tetraglycidyl ether; 4-(3,3-dihydroxy-2,4,4-trimethyl-2H-1-benzopyran-2-yl)-1,3-benzenediol glycidyl; tris(4-hydroxyphenyl)methane triglycidyl ether; N,N-diglycidyl-2-chloro-4-[2-chloro-N-glycidyl aniline methyl]aniline; tetrafunctional o-glycidyl resin; tetraglycidyl-4,4'-methylenediamine; tetraglycidyl-4,4'-dimethyldianiline; N,N,N,N'-tetraglycidyl-m-xylenediamine; tetraglycidylmethylenedianiline; and any combination thereof.

18. The method of claim 15, wherein the crosslinking diverting agent is selected from the group consisting of a long-chain amine having in the range of about 8 to about 90 carbon atoms and having at least one primary amine group, a polymeric amine, and any combination thereof.

19. The method of claim 15, further comprising a tubular extending into the wellbore and a pump fluidly coupled to the tubular, wherein the treatment fluid is introduced into the wellbore through the tubular.

20. A consolidation composition comprising:
a multi-functional epoxy resin comprising at least three epoxy groups,
the multi-functional epoxy resin being present in an amount in the range of about 0.5% to about 40% by volume of the consolidation composition;
a crosslinking diverting agent selected from the group consisting of a long-chain amine having in the range of about 8 to about 90 carbon atoms and having at least one primary amine group, a polymeric amine, and any combination thereof,
the crosslinking diverting agent being present in an amount in the range of about 0.1% to about 25% by volume of the consolidation composition; and
a hardening agent selected from the group consisting of a cyclo-aliphatic amine, an aromatic amine, an aliphatic amine, an imidazole, a pyrazole, a 1H-indazole, a purine, an indazole, an amine, a polyamine, a polyimine, an amide, a polyamide, a 2-ethyl-4-methyl imidazole, and any combination thereof,
wherein the hardening agent is present in an amount in the range of about 1% to about 75% by volume of the consolidation composition.

* * * * *